United States Patent
Kurokawa et al.

(10) Patent No.: US 8,040,662 B2
(45) Date of Patent: Oct. 18, 2011

(54) SOLID ELECTROLYTIC CAPACITOR

(75) Inventors: Akinari Kurokawa, Daito (JP); Yoshikazu Hirata, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 278 days.

(21) Appl. No.: 12/344,851

(22) Filed: Dec. 29, 2008

(65) Prior Publication Data

US 2009/0185331 A1 Jul. 23, 2009

(30) Foreign Application Priority Data

Jan. 23, 2008 (JP) ................. 2008-012661

(51) Int. Cl.
*H01G 4/228* (2006.01)
*H01G 9/10* (2006.01)
(52) U.S. Cl. ............... 361/540; 361/538; 361/533
(58) Field of Classification Search .......... 361/540, 361/533, 538
See application file for complete search history.

(56) References Cited

U.S. PATENT DOCUMENTS

| 6,972,943 | B2* | 12/2005 | Kato et al. ............... 361/533 |
| 7,447,000 | B2* | 11/2008 | Cheng et al. .............. 361/540 |
| 2007/0019366 | A1* | 1/2007 | Yamaguchi et al. ......... 361/540 |
| 2007/0081301 | A1* | 4/2007 | Tanaka .................... 361/540 |
| 2008/0158781 | A1* | 7/2008 | Wu et al. ................. 361/523 |
| 2009/0147448 | A1* | 6/2009 | Matsuoka et al. .......... 361/540 |
| 2009/0147449 | A1* | 6/2009 | Matsuoka et al. .......... 361/540 |

FOREIGN PATENT DOCUMENTS

JP 08-022932 A 1/1996

* cited by examiner

*Primary Examiner* — Eric Thomas
(74) *Attorney, Agent, or Firm* — Westerman, Hattori, Daniels & Adrian, LLP

(57) ABSTRACT

A solid electrolytic capacitor includes a cathode terminal structured such that the cathode terminal's flat portion connected to a cathode portion has a divided structure made up of a first flat portion and a second flat portion spaced from each other by a predetermined distance to form a slit. Therefore, even if the cathode terminal is caused to be peeled off from the cathode portion, the peeling can be restricted to only one of the first and second flat portions, so that the peeled-off area can be prevented from increasing. Accordingly, the reliability of the state of fixture of the cathode terminal to the cathode portion is improved, so that the solid electrolytic capacitor can be provided having the structure with which the reliability of the solid electrolytic capacitor can be improved.

3 Claims, 5 Drawing Sheets

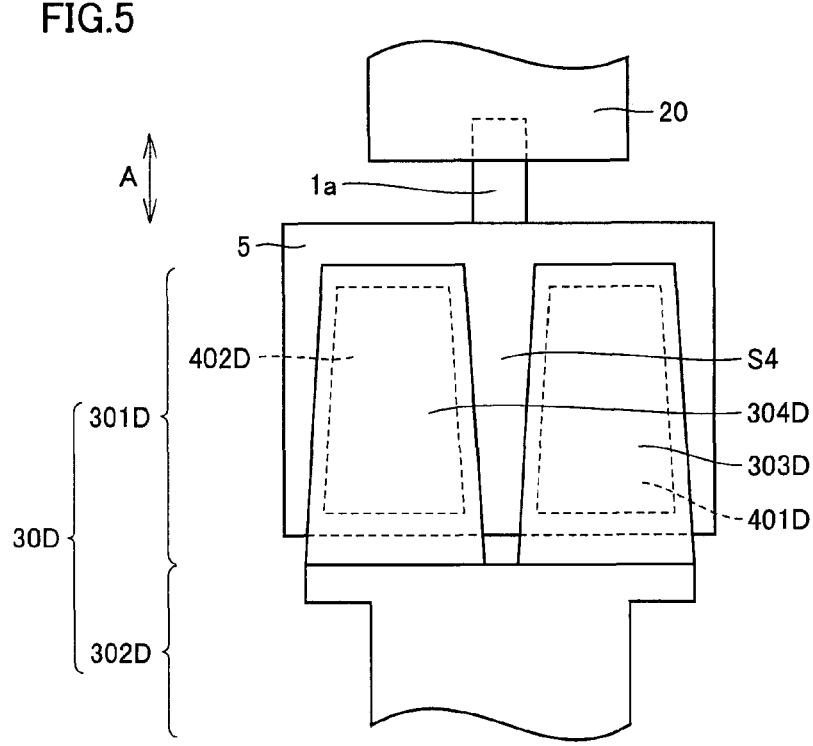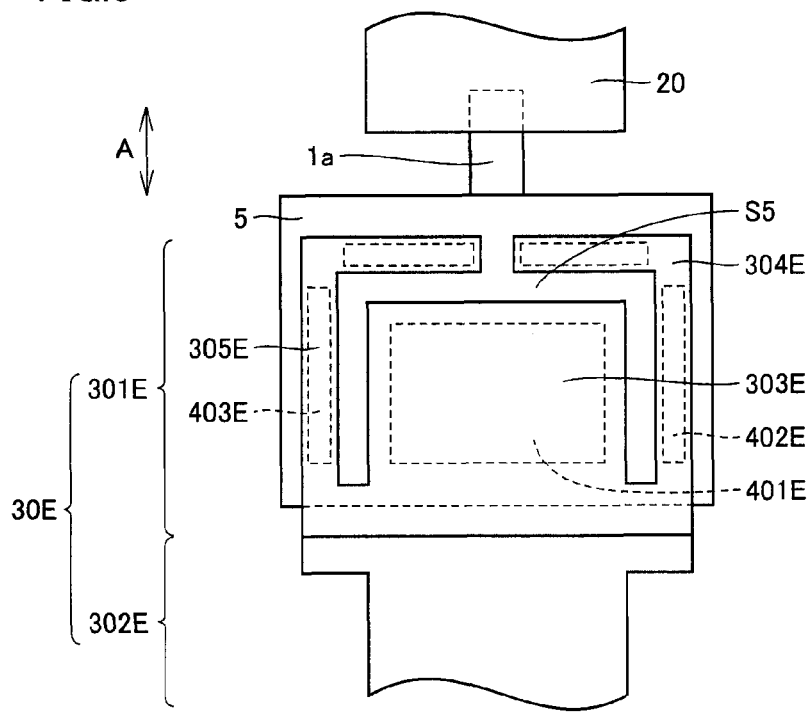

SOLID ELECTROLYTIC CAPACITOR

BACKGROUND OF THE INVENTION

1. Field of the Invention

The present invention relates to improvements in structure of a solid electrolytic capacitor.

2. Description of the Background Art

Referring to FIGS. 7 to 9, an example of the structure of a solid electrolytic capacitor will be described.

This solid electrolytic capacitor includes therein a cube-shaped Ta sintered body 1, as well as a dielectric oxide film 2, a polymer layer 3, a carbon layer 4, and a silver paste layer 5 that surround Ta sintered body 1. Ta sintered body 1 is provided with a cylindrical tantalum wire 1a protruding outside via dielectric oxide film 2.

In the solid electrolytic capacitor, tantalum wire 1a forms an anode portion while silver paste layer 5 forms a cathode portion. Here, in the following description, the tantalum wire is referred to as anode portion 1a and the silver paste layer is referred to as cathode portion 5. Further, Ta sintered body 1, dielectric oxide film 2, polymer layer 3, carbon layer 4, and silver paste layer 5 are collectively referred to as a capacitor element 10.

To anode portion 1a, a plate-shaped anode terminal 20 is electrically joined by resistance welding. To cathode portion 5, a plate-shaped cathode terminal 30 is electrically joined using an electrically conductive adhesive 40 such as silver adhesive. Cathode terminal 30 includes as shown in FIGS. 7 and 9 a flat portion 30a connected to cathode portion 5 and a lead portion 30b extended to the outside. A solid electrolytic capacitor having such a structure as described above is disclosed in Patent Document 1 (Japanese Patent Laying-Open No. 08-022932).

Here, flat portion 30a of cathode terminal 30 is connected to cathode portion 5 using electrically conductive adhesive 40. In a process of manufacturing the solid electrolytic capacitor, if an external force is applied to cathode terminal 30, cathode terminal 30 could be peeled off from cathode portion 5. After completion of the solid electrolytic capacitor, heat could cause cathode terminal 30 to be peeled off from cathode portion 5.

In the case where cathode terminal 30 is peeled off from cathode portion 5 due to any of the above-described factors, the equivalent series resistance (ESR) could increase and/or a failure such as open circuit could occur, possibly resulting in deterioration in reliability of the solid electrolytic capacitor.

SUMMARY OF THE INVENTION

A problem to be solved by the present invention is the deterioration in reliability of the solid electrolytic capacitor due to increase of the equivalent series resistance (ESR) and/or occurrence of a failure such as open circuit in the case where the cathode terminal is peeled off from the cathode portion as described above. Therefore, an object of the present invention is to provide a solid electrolytic capacitor having a structure where the reliability in the state of fixture of the cathode terminal to the cathode portion is improved and accordingly the reliability of the solid electrolytic capacitor can be improved.

A solid electrolytic capacitor according to the present invention includes: a capacitor element including an anode portion and a cathode portion; an anode terminal connected to the anode portion; and a cathode terminal connected to the cathode portion. The cathode terminal includes a flat portion connected to the cathode portion and a lead portion extended from the flat portion. The flat portion includes a first flat portion and a second flat portion spaced from each other by a predetermined distance to form a slit.

In the solid electrolytic capacitor according to the present invention, the cathode terminal is structured such that the flat portion connected to the cathode portion has a divided structure made up of a first flat portion and a second flat portion spaced from each other by a predetermined distance to form a slit. Therefore, even if the cathode terminal is caused to be peeled off from the cathode portion, occurrence of the peeling can be restricted to only one of the first and second flat portions. Accordingly, the peeled-off area can be prevented from increasing.

Further, the slit is formed to extend by a predetermined distance between the first flat portion and the second flat portion. Accordingly, when an adhesive used for connecting the cathode terminal to the cathode portion is to be hardened, evaporation of a solvent for the adhesive can be promoted through the slit.

Furthermore, even if the surface of the cathode portion is uneven or distorted, the divided structure of the flat portion connected to the cathode portion improves conformity of the flat portion to the surface of the cathode portion, as compared with the case where the flat portion is made up of a single section, and thus adherence of the flat portion to the cathode portion can be improved.

For the reasons above, the reliability of the state of fixture of the cathode terminal to the cathode portion is improved, and accordingly the reliability of the solid electrolytic capacitor can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a plan view of a solid electrolytic capacitor in a fourth embodiment of the present invention with an exterior resin removed.

FIG. 6 is a plan view of a solid electrolytic capacitor in a fifth embodiment of the present invention with an exterior resin removed.

DESCRIPTION OF THE PREFERRED EMBODIMENTS

Figure 1:
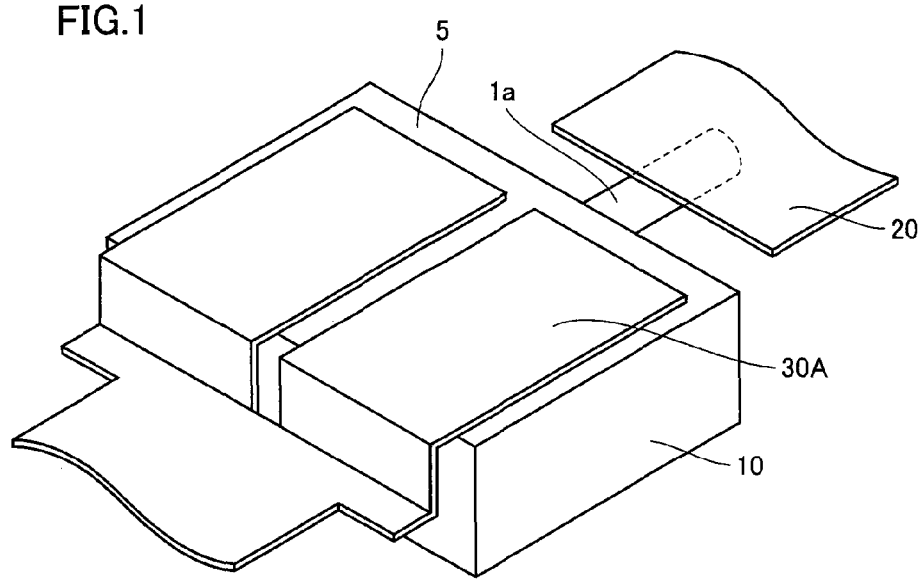
FIG. 1 is a perspective view of a solid electrolytic capacitor in a first embodiment of the present invention with an exterior resin removed.

In the following, a structure of a solid electrolytic capacitor in each embodiment of the present invention will be described with reference to the drawings. Features of the present invention are chiefly relevant to the structure of the cathode terminal connected to the cathode portion. Therefore, in the following description, the structure of the cathode terminal will be explained in detail, and those components that are identical or correspond to the components as described in connection with the background art will be denoted by the same reference characters, and the description thereof may not be repeated depending on the case. Further, since the described features relate to the internal structure of the solid electrolytic capacitor, the drawings are each shown with an exterior resin removed.

First Embodiment

Figure 2:
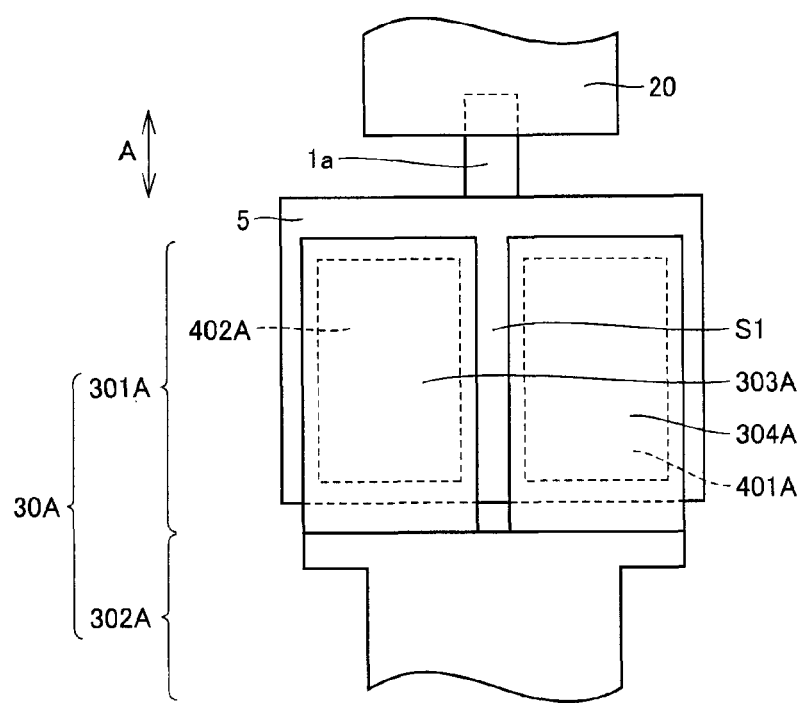
FIG. 2 is a plan view of the solid electrolytic capacitor in the first embodiment of the present invention with the exterior resin removed.

Referring to FIGS. 1 and 2, a structure of a solid electrolytic capacitor in a first embodiment will be described.

A cathode terminal 30A of the solid electrolytic capacitor in the present embodiment includes a flat portion 301A connected to a cathode portion 5 and a lead portion 302A extended from flat portion 301A. Further, flat portion 301A includes a first flat portion 303A and a second flat portion 304A spaced from each other by a predetermined distance to form a slit S1. In a portion between first flat portion 303A and cathode portion 5 and a portion between second flat portion 304A and cathode portion 5, electrically conductive adhesives 401A, 402A are applied respectively.

Slit S1 is provided along the direction (indicated by arrow A in the drawing) in which an anode portion 1a and cathode portion 5 extend in series. Further, slit S1 is provided to extend over the whole dimension of flat portion 301A in direction A of cathode portion 5.

In the solid electrolytic capacitor structured in the above-described manner, cathode terminal 30A is structured such that flat portion 301A connected to cathode portion 5 has a divided structure made up of first flat portion 303A and second flat portion 304A disposed with a predetermined distance therebetween to form slit S1. Therefore, even if cathode terminal 30A is caused to be peeled off from cathode portion 5, the peeling can be restricted to only one of flat portions 303A, 304A, so that the peeled-off area can be prevented from increasing.

Further, slit S1 is formed to extend by a predetermined distance between first flat portion 303A and second flat portion 304A. Therefore, when adhesives 401A, 402A used for connecting cathode terminal 30A to cathode portion 5 are to be hardened, evaporation of a solvent for adhesives 401A, 402A can be promoted through slit S1.

Moreover, even if the surface of cathode portion 5 is uneven or distorted, flat portion 30A connected to cathode portion 5 is formed with a divided structure made up of first flat portion 303A and second flat portion 304A, so that conformity of the flat portion to the surface of cathode portion 5 is improved as compared with the structure made up of one section. Accordingly adherence of flat portion 30A to cathode portion 5 can be improved.

Second Embodiment

Figure 3:
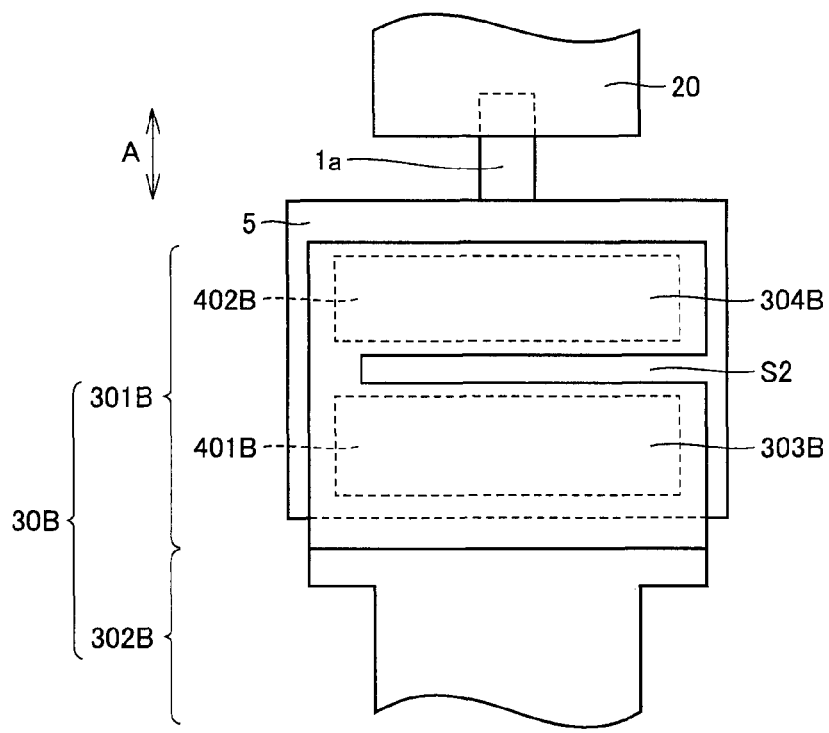
FIG. 3 is a plan view of a solid electrolytic capacitor in a second embodiment of the present invention with an exterior resin removed.

Referring now to FIG. 3, a structure of a solid electrolytic capacitor in a second embodiment will be described.

A cathode terminal 30B of the solid electrolytic capacitor in the present embodiment includes a flat portion 301B connected to a cathode portion 5 and a lead portion 302B extended from flat portion 301B. Further, flat portion 301B includes a first flat portion 303B and a second flat portion 304B spaced from each other by a predetermined distance to form a slit S2. In a portion between first flat portion 303B and cathode portion 5 and a portion between second flat portion 304B and cathode portion 5, electrically conductive adhesives 401B, 402B are applied respectively.

Slit S2 is provided in the direction (lateral direction) crossing the direction (indicated by arrow A in the drawing) in which an anode portion 1a and cathode portion 5 extend in series. Further, slit S2 is provided over a substantially entire dimension in the lateral direction of flat portion 301B.

With the solid electrolytic capacitor structured in the above-described manner, functions and effects similar to those of the solid electrolytic capacitor in the above-described embodiment can be achieved.

Third Embodiment

Figure 4:
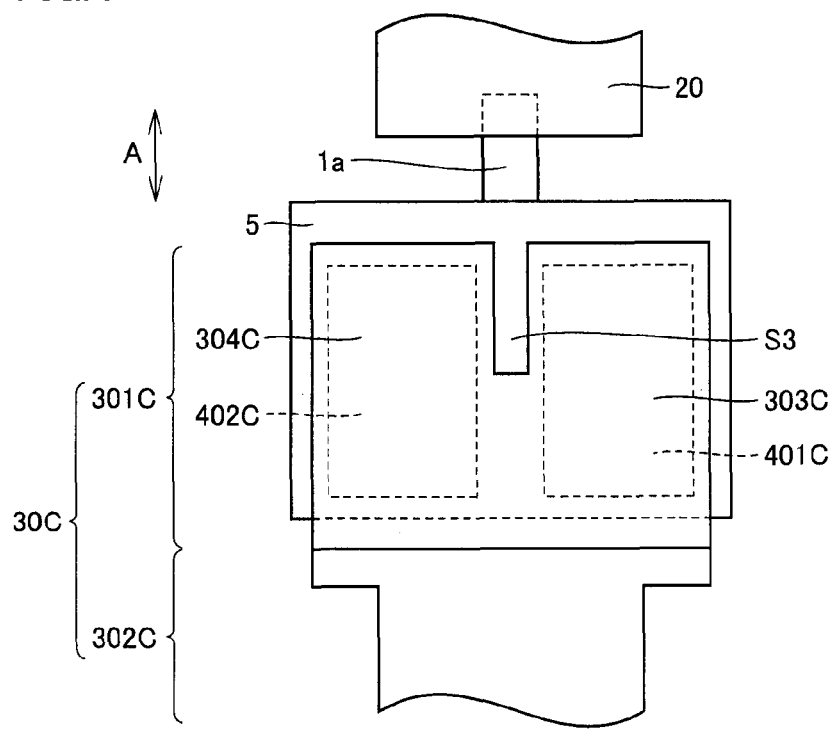
FIG. 4 is a plan view of a solid electrolytic capacitor in a third embodiment of the present invention with an exterior resin removed.
Figure 7:
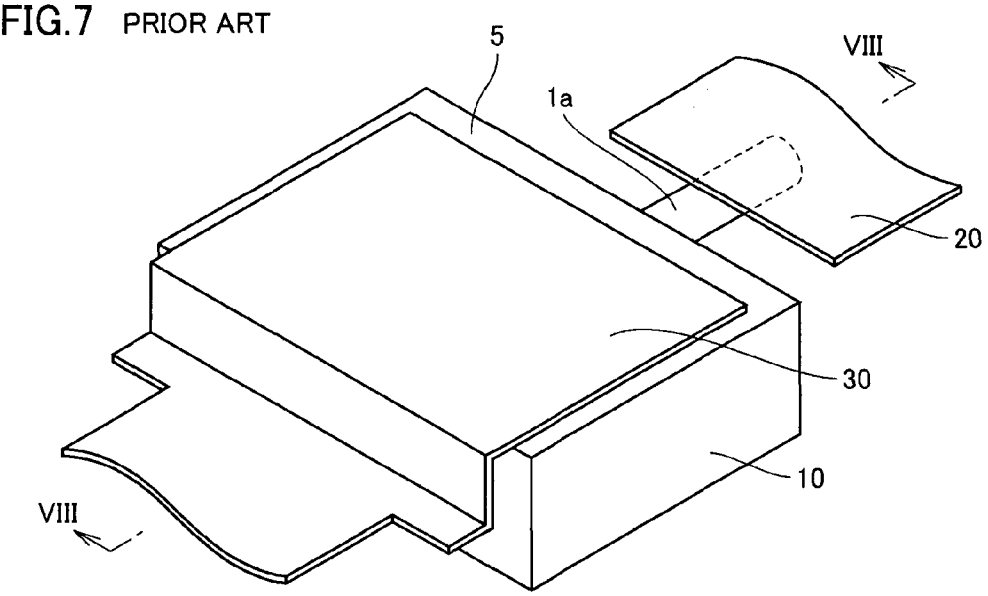
FIG. 7 is a perspective view of a solid electrolytic capacitor of the background art with an exterior resin removed.
Figure 8:
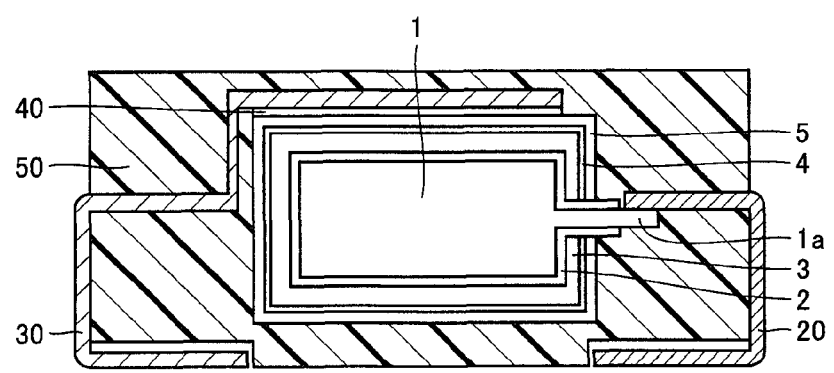
FIG. 8 is a diagram showing a cross sectional structure along line VIII-VIII in FIG. 7 as seen in the direction indicated by the arrow.
Figure 9:
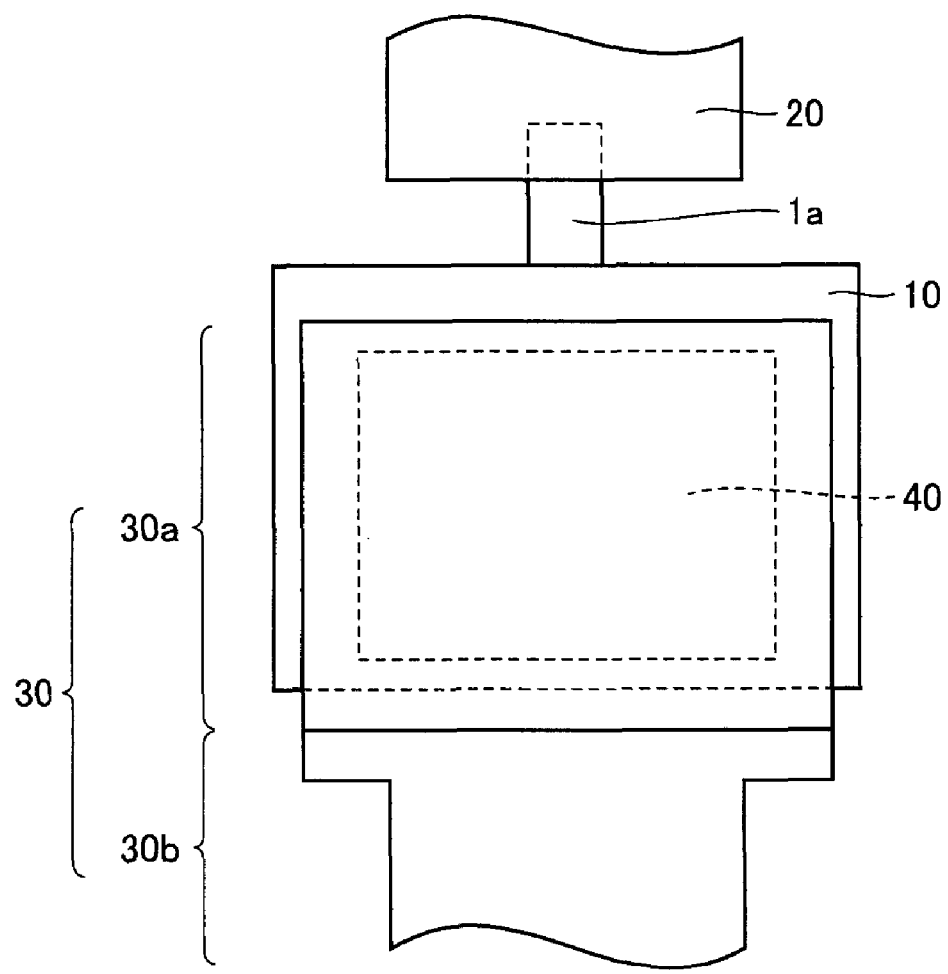
FIG. 9 is a plan view of the solid electrolytic capacitor of the background art with the exterior resin removed.

Referring now to FIG. 4, a structure of a solid electrolytic capacitor in a third embodiment will be described.

A cathode terminal 30C of the solid electrolytic capacitor in the present embodiment includes a flat portion 301C connected to a cathode portion 5 and a lead portion 302C extended from flat portion 301C. Flat portion 301C includes a first flat portion 303C and a second flat portion 304C spaced from each other by a predetermined distance to form a slit S3. In a portion between first flat portion 303C and cathode portion 5 and a portion between second flat portion 304C and cathode portion 5, electrically conductive adhesives 401C, 402C are applied respectively.

Slit S3 is provided along the direction (indicated by arrow A in the drawing) in which an anode portion 1a and cathode portion 5 extend in series. Further, slit S3 is provided to extend in direction A of cathode portion 5 to a substantially central region of flat portion 301C.

With the solid electrolytic capacitor structured in the above-described manner, functions and effects similar to those of the above-described embodiments each can be achieved.

Fourth Embodiment

Referring now to FIG. 5, a structure of a solid electrolytic capacitor in a fourth embodiment will be described.

A cathode terminal 30D of the solid electrolytic capacitor in the present embodiment includes a flat portion 301D connected to a cathode portion 5 and a lead portion 302D extended from flat portion 301D. Further, flat portion 301D includes a first flat portion 303D and a second flat portion 304D spaced from each other by a predetermined distance to form a slit S4. In a portion between first flat portion 303D and cathode portion 5 and a portion between second flat portion 304D and cathode portion 5, electrically conductive adhesives 401D, 402D are applied respectively.

Slit S4 is provided along the direction (indicated by arrow A in the drawing) in which an anode portion 1a and cathode portion 5 extend in series. Further, slit S4 is provided to extend over the whole dimension of flat portion 301D in direction A of cathode portion 5. Furthermore, the sides of first flat portion 303D and second flat portion 304D are inclined as seen in plan view, so that the width of slit S4 becomes smaller as the distance from anode portion 1a increases.

With the solid electrolytic capacitor structured in the above-described manner, functions and effects similar to those of the above-described embodiments each can be achieved.

Fifth Embodiment

Referring to FIG. 6, a structure of a solid electrolytic capacitor in a fifth embodiment will be described.

A cathode terminal 30E of the solid electrolytic capacitor in the present embodiment includes a flat portion 301E connected to a cathode portion 5 and a lead portion 302E extended from flat portion 301E. Further, flat portion 301E includes a first flat portion 303E as well as a second flat portion 304E and a third flat portion 305E spaced from each other by a predetermined distance to form a slit S5 surrounding first flat portion 303E. In a portion between first flat portion 303E and cathode portion 5, a portion between second flat portion 304E and cathode portion 5 and a portion between third flat portion 305E and cathode portion 5, electrically conductive adhesives 401E, 402E, 403E are applied respectively.

Slit S5 is provided to surround first flat portion 303E and is also provided between second flat portion 304E and third flat portion 305E.

With the solid electrolytic capacitor structured in the above-described manner, functions and effects similar to those of the above-described embodiments each can be achieved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor comprising: a capacitor element including an anode portion and a cathode portion; an anode terminal connected to said anode portion; and a cathode terminal connected to said cathode portion, said cathode terminal including a flat portion connected to said cathode portion and a lead portion extended from said flat portion, said flat portion including a first flat portion and a second flat portion separated by a slit extending from one end of said flat portion through a substantially central region of said flat portion, and said first flat portion and said second flat portion being located in the same plane, wherein the width of said slit becomes narrower from said anode portion.

2. The solid electrolytic capacitor according to claim 1, wherein said slit is provided along a direction in which said anode portion and said cathode portion extend in series.

3. The solid electrolytic capacitor according to claim 1, wherein said slit extends to near the other end of said flat portion opposite to said one end.

* * * * *